No. 32,878.  PATENTED JULY 23, 1861.
G. KOBER.
WATER METER.
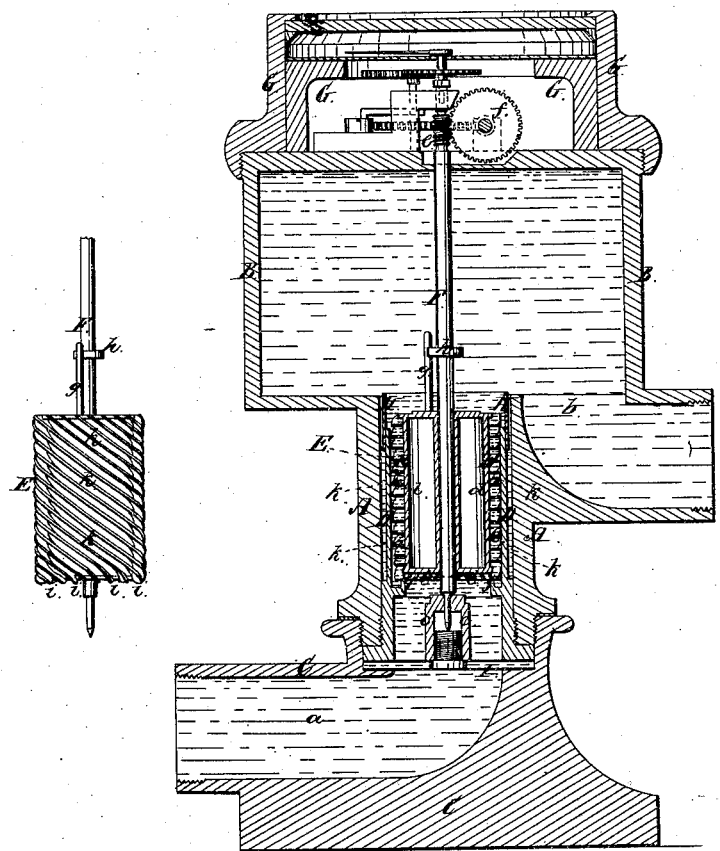
Fig: 3.
Witnesses:  
Inventor:  
G. Kober.

U. S. PATENT OFFICE.

No. 1,874.  1861.  Whole No. 32,878.

Water Meters.

G. KOBER, OF NEW YORK, N. Y.

Letters Patent No. 1,874, dated July 23, 1861.

SPECIFICATION.

TO ALL WHOM IT MAY CONCERN:

Be it known, that I, GOTTFRIED KOBER, of the city, county and State of New York, have invented a new and useful improvement in Meters for Measuring the Flow of Water and other Liquids; and I do hereby declare that the following is a full, clear, and exact description of the same, reference being had to the accompanying drawings forming part of this specification, in which—

Figure 1 is a central vertical section of a meter with my improvements.

Figure 2 is a side view of the measuring wheel.

Figure 3 is an inverted plan of the same.

Similar letters of reference indicate corresponding parts in the several figures.

This invention relates to the class of meters which effect the measurement of the water or other liquid by its action upon a screw or spiral-bladed wheel.

A great obstacle to perfect measurement by this class of meters has hitherto been, that the velocity of rotation of the screw or wheel has been greater, relatively to a high velocity of the passage of the liquid through it, than it has been to a low velocity, and in many examples the liquid might be drawn through the meter very slowly without moving the screw or wheel at all. This invention consists in a certain construction of the screw or wheel, and mode of applying the same to the shaft, and in relation to the mouth of the passage through which the liquid is admitted to act upon it, whereby the above mentioned difficulty is obviated.

A B is an upright trunk of cast iron, or other metal, having its upper part B

*Kober's Improvement in Water Meters.* larger than the lower part A, but both of cylindrical form. This trunk is erected upon a hollow base C, through which there is an inlet $a$ to the bottom of the trunk for the liquid to be measured, suppose water, for example, the outlet $b$ being at the bottom of the upper portion B of the trunk. G is the register box on the top of the said trunk. D is an upright cylinder or cylindrical lining of brass or other metal screwed into the bottom of the trunk and extending upward to within a short distance from the top of the smaller portion A thereof, for the reception of the spiral-bladed wheel E, which fits quite loosely to said cylinder D, so that it works without friction therein. The upright shaft F of this wheel works in an oil box bearing $c$, in a brace extending across the bottom of the cylinder D, and in a bearing in the top of the trunk A B, and its upper part, having a screw-thread $c$ cut upon it, enters the register box G above said screw, gearing with the first wheel $f$ of the registering train. The wheel E is made with a hollow air-tight cylindrical hub $d$, the cavity therein being of such capacity that, though the wheel will not float, it will rise with any considerable pressure of water on its under side, notwithstanding the free passage of water around it; and in order to permit it to rise and fall, it is fitted to slide upon its shaft F, and is furnished with a long pin $g$ at its upper end, entering a notch in a collar $h$ on the shaft, for the purpose of causing the latter always to rotate with it. $k\,k$ are the spiral blades of the wheel winding round the hub like the threads of a screw, made very thin and arranged at short distances apart. These blades are extended a short distance below the bottom of the hub, as shown at $i\,i$, the action of the water upon the so extended portions, which constitutes one of the features of this invention, being like the action on the buckets of a turbine water wheel and independent of the action of the water on those portions which surround the hub, as will be presently explained. $j$ is an annular seat projecting upward within the lower part of the cylinder D, and having a narrow face upon which the wheel E rests when no water is being drawn through the meter. The opening in this seat constitutes the mouth of the passage by which the water enters the portion of the cylinder D which contains the wheel E. H is a short tube or collar fitted to slide on the upper part of the cylinder D, for the purpose of forming an upward prolongation of the said cylinder. I is a strainer placed at the bottom of the cylinder D, to exclude any dirt that might prevent the action of the meter.

The water, entering the meter at $a$, passes upward through the opening in the seat $j$, raises the wheel E, and passes under it and between its spiral blades, and fills the trunk cylinder D and trunk A B. When the outlet is closed, the wheel rests on the seat $j\,j$; but as soon as the outlet is opened, in drawing off the water, and the pressure above the wheel is thereby reduced, the pressure of the water below raises the wheel, and the water passes first between the hub of the wheel and the seat $j\,j$, through the passages between the turbine-like lower portions $i\,i$ of the blades, in a horizontal or nearly horizontal direction, and then ascends the passages between the spiral portions $k\,k$ of the blades surrounding the cylindrical hub, first acting on the portions $i\,i$, as upon the buckets of a turbine wheel, and then against the spiral portions above, and in both cases acting with a tendency to produce the rotation of the wheel in one direction.

When the outlet is not much opened, or there is not a very high pressure on the inlet, and the water is consequently passing through the meter with little velocity, the pressure below the wheel being but little in excess of the pressure above, the wheel is a very little raised from its seat, and the water is caused to pass between the wheel and seat and through the passages between the turbine-like portions $i\,i$ of the blades, in a horizontal direction, and thereby caused to act with great effect upon the said portions; but when the upward pressure is greater, owing to a greater opening of the outlet, or greater pressure on the inlet, and the velocity of the water is therefore greater, the wheel is raised higher and the water passes between the seat $j$ and the bottom of the wheel in a more upward direction, and, therefore, acts with less effect upon the turbine-like portions $i\,i$ of the blades, and the wheel may be raised so high that the turbine-like action is inappreciable. Hence, it will be understood that, when the water is least effective on the spiral portions of the blades outside of the hub, it is most effective on the turbine, and vice versa.

The cylinder D is represented as not higher than the wheel E. The reason of this is, that, when the meter is in operation, a portion of the wheel may be above the said cylinder, where, if the tube H were not raised above the cylinder, it would be surrounded by the greater body of water in the portion of the trunk above, which water, ascending more slowly than that in the cylinder, would obstruct the revolution of the wheel; and the more of the wheel there was exposed above the cylinder, the greater would be the obstruction, and the less would be the number of revolutions produced by a given quantity of water passing through the wheel. By raising the tube H above the cylinder more or less, the obstruction is more or less diminished, and vice versa, as the said tube, forming a continuation of the cylinder, protects the wheel from the obstructing influence of the greater body of water above the cylinder, and hence, by raising or lowering the said tube, the meter may be adjusted with the greatest accuracy. When the quantity indicated by the register is less than that actually passing, the tube H requires to be raised, and vice versa.

The tube H is more especially useful in constructing the first meter of a given capacity; but when the proper proportions of the several parts of the meter have been ascertained for a meter of the required capacity, any number of meters of the same capacity may be made. The inner cylinder or lining D may, in most cases, be dispensed with, and the cylindrical portion A of the trunk be bored for the reception of the wheel D, the seat $j\,j$ being, in such case, made of a separate piece and screwed into the bottom of the trunk.

What I claim as my invention, and desire to secure by Letters Patent, is—

The downward extension of the spiral blades $k\,k$ from the exterior periphery of the rising and falling cylindrical hub $d$, below the bottom thereof, as shown at $i\ i$, in combination with an annular seat $jj$, of smaller diameter than the said hub, substantially as and for the purpose herein set forth.

<div style="text-align: right">G. KOBER.</div>

Witnesses:
    M. M. LIVINGSTON,
    DAVID STEWART.